Figure 1:
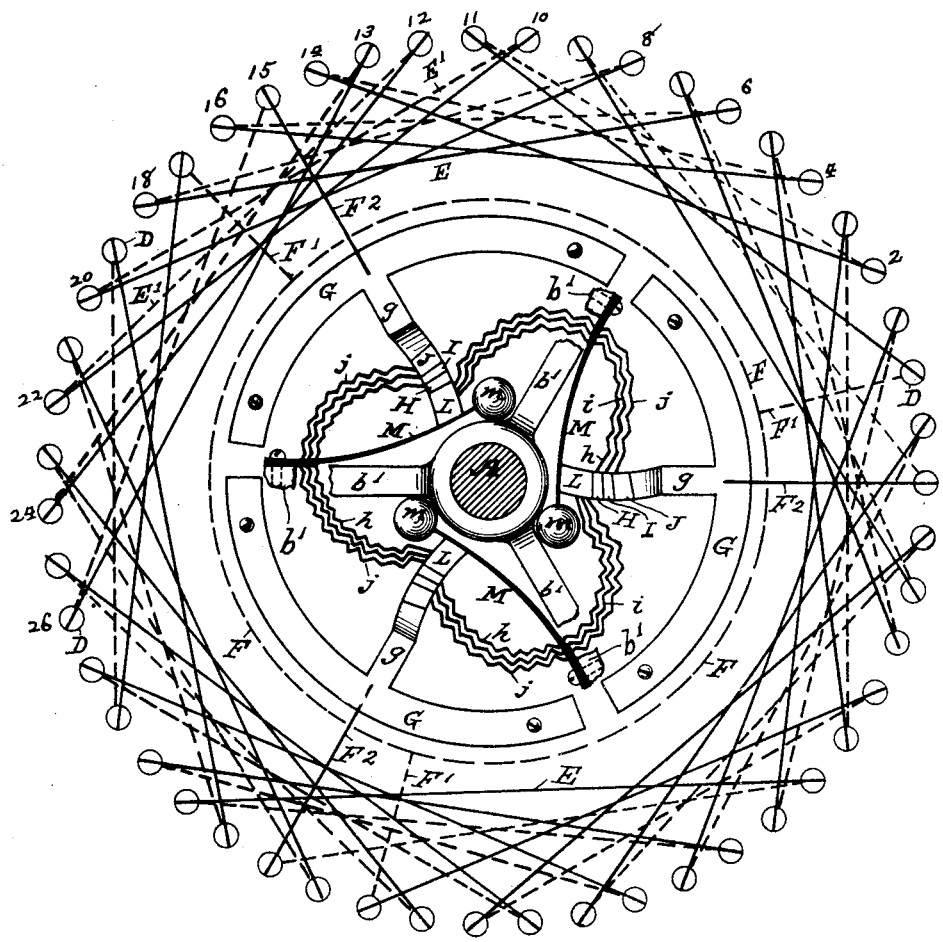

(No Model.)  2 Sheets—Sheet 1.

A. L. CUSHMAN.
ARMATURE FOR INDUCTION MOTORS.

No. 588,692.  Patented Aug. 24, 1897.

Witnesses  Inventor
F. S. Perry  Abr. L. Cushman
R. Burroughs  By his Attorney J. B. Thurston

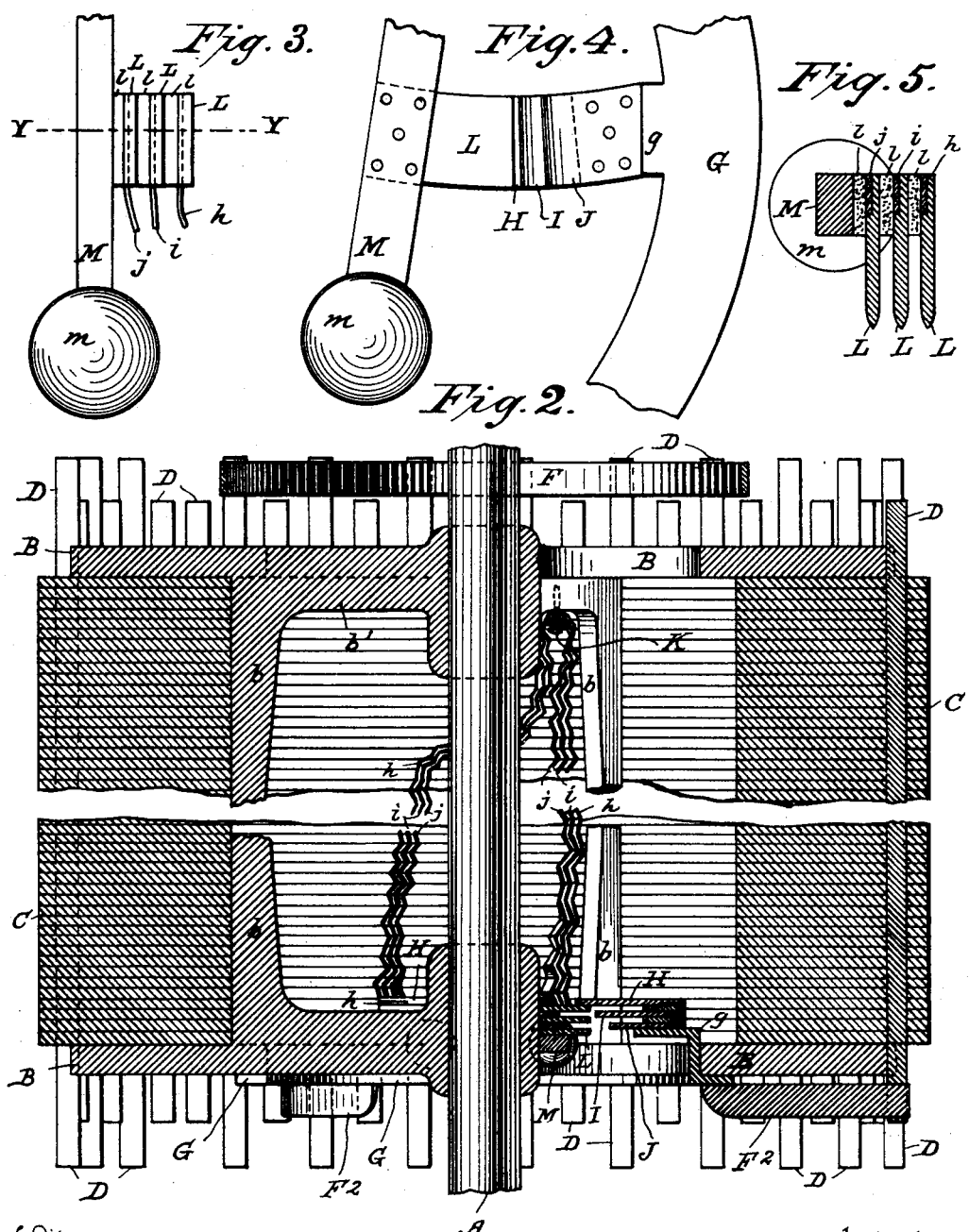

UNITED STATES PATENT OFFICE.

ABE L. CUSHMAN, OF CONCORD, NEW HAMPSHIRE, ASSIGNOR OF ONE-HALF TO BENJAMIN A. KIMBALL, OF SAME PLACE.

ARMATURE FOR INDUCTION-MOTORS.

SPECIFICATION forming part of Letters Patent No. 588,692, dated August 24, 1897.

Application filed August 15, 1894. Serial No. 520,352. (No model.)

*To all whom it may concern:*

Be it known that I, ABE L. CUSHMAN, a citizen of the United States, residing at Concord, in the county of Merrimac and State of New Hampshire, have invented certain new and useful Improvements in Armatures for Induction-Motors; and I do hereby declare the following to be a full, clear, and exact description of the invention, such as will enable others skilled in the art to which it appertains to make and use the same.

My invention relates to alternating-current motors, and applies especially to armatures for the same, which are wound with magnetizing-coils, each forming in itself a separate closed circuit not connected to an electrical source. These coils consist of copper bars extending longitudinally across a laminated core; and the novelty of my improved construction consists in short-circuiting each magnetizing-coil of the armature through a separate resistance-coil contained within the armature, all said resistance-coils being uniformly and automatically adjusted in exact ratio with the increasing or diminishing speed of a motor.

The object of my invention is to enhance the starting torque of a motor of this character and to better control its speed and power. This I accomplish by an improved method of winding which progressively changes the poles of the armature and by introducing my improved resistance-coils through which said magnetizing-coils are short-circuited. In the case of small motors which are not designed to give much power this same result can be obtained by introducing a series of independent magnetizing-coils with the short-circuit coils, which I have made the subject of a separate application, the present construction applying especially to motors required to give a greater amount of power.

In the accompanying drawings, Figure 1 is an elevation showing the magnetizing-coils and my improved method of short-circuit connections for their ends (one end being shown in full lines and the opposite end in dotted lines) and my improved resistance-coils and their connection devices. Fig. 2 is a broken plan of my improved armature. Figs. 3, 4, and 5 are details illustrating, on an enlarged scale, the adjustable connections for the resistance and short-circuit coils.

A is an arbor.

B represents the core-clamping rings, having lateral-projecting arms $b$, serving as internal supports for the laminated core C, and these are rigidly mounted upon the said arbor.

The copper bars or magnetizing-coils D are placed at even intervals across the periphery of the core, projecting at each end, said ends being connected in sets, as will be hereinafter explained, one end of each set being connected to a short-circuit ring at one end of the armature, and the other or opposite end is connected to a segment of a ring at the opposite end of the armature, each of said ring-segments being also connected to one end of either resistance-coil, having its other end attached to a spring-lever or a spring-actuated lever.

In Fig. 1 wherever it was possible single lines have been used to designate various parts. For example, the circuit connections E for the bars D are represented by single lines and those at the opposite end of the armature by dotted lines E'. The short-circuit ring F is also represented by a single dotted circle, which is connected with one end of each set of magnetizing-coils by a bar F, also shown by a single dotted line, the other end of each magnetizing-coil being attached by a bar $F^2$ (shown in this view by a single full line) to a ring-segment G, which may be secured to one of the core-clamping rings B by screws, as shown, the rings being properly insulated from each other, however.

The core C may be ventilated by cutting away a portion of said ring B, leaving spokes $b'$ to support its hub, as shown.

My present improvements also embrace an automatically-variable resistance—*i. e.*, the resistance will be capable of being increased or diminished automatically during revolution of the armature and in accordance with the speed thereof, and this is accomplished in the following manner: The ring-segments G are provided with an arm $g$, and these are bent inward sufficiently for the convenient attachment of suitable contact points or plates arranged to mesh or engage with similar plates upon a lever, which is either made of spring-steel, as represented in Fig. 1, or is held by a spring normally, or when the motor is at rest in such position relative to the said contact-plates as will close the circuit of the magnetizing-coils through the highest degree of resistance, said levers moving (after the armature starts) by centrifugal action gradually toward the contact-plates on the ring-segment G until one after the other shall have formed contact with those plates on the lever, or rather until all are in contact, which cuts out all resistance. The contact-plates attached to the arm of the ring-segment may number two or more, the longest, H, being of German silver or any material possessing a high degree of electrical resistance and the shortest being of pure copper; but I prefer to use in connection with these one or more plates composed of alloy and possessing different degrees of resistance. Hence I show a plate I, which is composed of alloy, between the pure German silver plate H and the plate J, which is composed of pure copper. To these are attached long strips of metal, respectively $h$ $i$ $j$, the composition of each strip agreeing with that of the plate to which it is connected and which form my improved resistance-coils. Each of the strips $h$ $i$ $j$ is provided with an insulating-covering, and in order that sufficient metal may be contained in the said coils the strips may be crimped, as shown, their center being supported at the opposite end of the armature in any convenient manner—such, for instance, as seen in Fig. 2, wherein the support is a screw K, threaded to one of the spokes $b'$ of the clamping-ring B—and their opposite ends are connected each with one of the contact-plates L, attached to a spring-lever M, each of the plates L being composed of pure copper and insulated by dividing-plates $l$ from each other and from the lever M, as seen in Figs. 3 to 5.

The levers M are pivoted at any available point within the armature-core, or to a spoke $b'$ of either clamping-ring B, and their free end will carry a weight $m$ to counteract the influence of their spring with the aid of centrifugal force.

The method of winding the magnetizing-coils may be readily discovered by reference to Fig. 1 of the drawings, in which I designate the bars D of a given coil by figures. Commencing at the right, the short-circuit ring F is connected by the bar F' to the first of the series of bars D composing this particular magnetizing-coil. Thence each of the bars D composing this coil are connected at alternate ends, respectively, by the bars E E' as follows: D to 11, 11 to 2, 2 to 14, 14 to 4, 4 to 16, 16 to 6, 6 to 18, 18 to 8, 8 to 20, 20 to 10, 10 to 22, 22 to 12, 12 to 24, 24 to 13, 13 to 26, 26 to 15, and 15 by a bar $F^2$ to one of the ring-segments G.

Heretofore it has been impracticable to vary the speed of induction-motors, because to attain the best results the motor must synchronize with the generator; but I obviate this difficulty by introducing a resistance composed of alloy combined with other materials, whereby the electrical resistance is reduced so gradually as to prevent burning out the armature. The direct result of this combination of an alloy with a higher degree of resistance is to decrease the resistance-conductors without increasing size of armature and to decrease the speed without excessive heating, and to this end that member of the resistance composed of alloy is a necessary element, if the objects or desired results of this invention are to be attained.

Having clearly explained my improvements, what I claim is—

In an armature for induction-motors, a core having a short-circuiting ring at one end and short-circuiting-ring segments at the other, and two or more interiorly-connected plates insulated from each other, a series of energizing-coils externally arranged upon said core one end of each coil connected to said plates and the opposite end closed on the short-circuiting ring, spring-actuated levers pivoted within said core and provided with plates insulated from each other and adapted for contact with those of the core, and coils provided within said core and composed of separate insulated wires of varying degrees of resistance, one end of said interior coil being attached to the plates of said core and the other to the plates of said levers, substantially for the purpose set forth.

In testimony whereof I affix my signature in presence of two witnesses.

ABE L. CUSHMAN.

Witnesses:
J. B. THURSTON,
CARRIE E. EVANS.